United States Patent
Akao

(10) Patent No.: US 10,648,048 B2
(45) Date of Patent: May 12, 2020

(54) HEXAVALENT CHROMIUM TREATMENT AGENT AND LEATHER OR LEATHER ARTICLE PRODUCED USING THE SAME

(71) Applicant: CITIZEN WATCH CO., LTD., Tokyo (JP)

(72) Inventor: Yuji Akao, Tokyo (JP)

(73) Assignee: CITIZEN WATCH CO., LTD., Nishitokyo-Shi, Tokyo (JP)

( * ) Notice: Subject to any disclaimer, the term of this patent is extended or adjusted under 35 U.S.C. 154(b) by 0 days.

(21) Appl. No.: 16/068,698

(22) PCT Filed: Jan. 27, 2017

(86) PCT No.: PCT/JP2017/002890
§ 371 (c)(1),
(2) Date: Jul. 9, 2018

(87) PCT Pub. No.: WO2017/131139
PCT Pub. Date: Aug. 3, 2017

(65) Prior Publication Data
US 2019/0024197 A1   Jan. 24, 2019

(30) Foreign Application Priority Data
Jan. 29, 2016  (JP) .................................. 2016-016065

(51) Int. Cl.
| C14C 3/08 | (2006.01) |
| A62D 3/37 | (2007.01) |
| C11D 1/72 | (2006.01) |
| C11D 1/75 | (2006.01) |
| C11D 3/20 | (2006.01) |
| C11D 3/00 | (2006.01) |
| C14C 3/06 | (2006.01) |
| C09K 3/00 | (2006.01) |
| A62D 101/24 | (2007.01) |
| A62D 101/43 | (2007.01) |

(52) U.S. Cl.
CPC .................. *C14C 3/08* (2013.01); *A62D 3/37* (2013.01); *C09K 3/00* (2013.01); *C11D 1/72* (2013.01); *C11D 1/75* (2013.01); *C11D 3/0031* (2013.01); *C11D 3/0042* (2013.01); *C11D 3/2034* (2013.01); *C11D 3/2058* (2013.01); *C11D 3/2065* (2013.01); *C14C 3/06* (2013.01); *A62D 2101/24* (2013.01); *A62D 2101/43* (2013.01)

(58) Field of Classification Search
CPC .. A62D 3/37; A62D 2101/24; A62D 2101/43; C09K 3/00; C11D 1/72; C11D 1/75; C11D 3/2058; C11D 3/0031; C11D 3/0042; C11D 3/2034; C11D 3/2065; C14C 3/06; C14C 3/08
See application file for complete search history.

(56) References Cited

U.S. PATENT DOCUMENTS

| 6,685,747 B1 | 2/2004 | Burrow et al. | |
| 10,358,686 B2 * | 7/2019 | Akao | A62D 3/37 |
| 2002/0072473 A1 | 6/2002 | Ashcroft et al. | |
| 2002/0185382 A1 * | 12/2002 | Fauvarque | C02F 1/4672 205/742 |
| 2009/0014094 A1 * | 1/2009 | Kuezynski | C23C 22/83 148/265 |
| 2009/0249554 A1 | 10/2009 | Strijbos | |
| 2014/0023555 A1 * | 1/2014 | Monzyk | A62D 3/37 422/28 |
| 2017/0233835 A1 | 8/2017 | Akao | |

FOREIGN PATENT DOCUMENTS

| CN | 102977792 A | * | 3/2013 |
| EP | 1478722 B1 | | 5/2006 |
| JP | H08-27499 A | | 1/1996 |
| JP | H10-85716 A | | 4/1998 |
| JP | 2002-536502 A | | 10/2002 |
| JP | 2003-010676 A | | 1/2003 |
| JP | 2003010676 A | * | 1/2003 |
| JP | 2008-231388 A | | 10/2008 |
| JP | 2008231388 A | * | 10/2008 |
| JP | 2010-082539 A | | 4/2010 |
| JP | 2010-100750 A | | 5/2010 |
| WO | 2016/021461 A1 | | 2/2016 |

OTHER PUBLICATIONS

"Knowledge of Leather", the Japanese Association of Leather Technology (retrieved online on Dec. 14, 2015), Internet URL: http://www.hikaku-Kyo.org/htdoc/hikakunochisiki-04.htm (6 pages total).
International Search Report dated Feb. 28, 2017 issued by the International Searching Authority in No. PCT/JP2017/002890.
Communication dated Aug. 14, 2019, from the European Patent Office in counterpart European Application No. 17744369.4.

* cited by examiner

*Primary Examiner* — Anthony J Green
(74) *Attorney, Agent, or Firm* — Sughrue Mion, PLLC

(57) ABSTRACT

Provided is a hexavalent chromium treatment agent capable of penetrating inside of a leather and capable of reducing not only hexavalent chromium present in the vicinity of the surface of the leather but also hexavalent chromium present inside the leather into trivalent chromium. The hexavalent chromium treatment agent of the present invention comprises a hexavalent chromium-reducing compound capable of reducing hexavalent chromium into trivalent chromium, a nonionic surfactant, and an aqueous solvent. The hexavalent chromium-reducing compound preferably comprises an organic compound (A) that has a specific structure capable of acting to reduce hexavalent chromium into trivalent chromium, that has a hydroxyphenyl group, and that has no aldehyde groups and no carboxyl groups.

5 Claims, No Drawings ial Journal of European Union on Mar. 26, 2014. Concern-
HEXAVALENT CHROMIUM TREATMENT AGENT AND LEATHER OR LEATHER ARTICLE PRODUCED USING THE SAME

CROSS REFERENCE TO RELATED APPLICATIONS

This application is a National Stage of International Application No. PCT/JP2017/002890, filed Jan. 27, 2017, claiming priority based on Japanese Patent Application No. 2016-016065, filed Jan. 29, 2016.

TECHNICAL FIELD

The present invention relates to a hexavalent chromium treatment agent and a leather or leather article produced using the same.

BACKGROUND ART

Leather articles are used in various products such as watchbands and handbags. In particular, the visual appearance of the leather enhances the commercial value of watchbands and handbags, increasing the level of satisfaction of consumers. It is needless to say that such products are designed to allow the leather to be in direct touch with the user's skin and that the feel of the leather against the skin further enhances an added value to the products.

Production of such a leather article entails making a large leather sheet in advance. In the leather production, an animal skin to be used in the leather article, such as the skin of crocodile or cow, is obtained first. The skin as obtained has low durability and cannot be used by itself. Thus, the skin is subjected to tanning. This tanning imparts heat resistance and durability to the skin, so that a leather is produced from the skin. The leather thus obtained is dyed with a desired color, or the surface texture of the leather is modified. In this manner, a sheet of leather is obtained. When this sheet is used to produce a leather article, for example, a process is performed in which the sheet is cut into a shape suitable for the intended use, and the cut sheet is attached to a core material or the like with an adhesive. Such a technique for production of leather articles has been traditionally used and is widely known.

Tanning is a technique for obtaining a durable leather by treating skin. Tannin acquired from plants had been used in the past; however, treatment with tannin fails to achieve sufficient heat resistance, flexibility, and elasticity. Recently, therefore, chrome tanning that uses a chromium tanning agent (basic chromium sulfate) and that can achieve high heat resistance, flexibility, and elasticity has become mainstream. The chrome tanning is employed for more than 90% of tanning treatments performed throughout the world and has the greatest economical importance. A hydrated chromium complex is embedded between carboxyl groups of glutamic acid and aspartic acid in a collagen peptide structure, so that a soft, durable leather is obtained. The method for chrome tanning is widely well-known and is described, for example, in Non Patent Literature 1.

High-quality leathers or leather articles with excellent heat resistance, flexibility, and elasticity are obtained typically through chrome tanning. Chrome tanning agents for chrome tanning contain chromium; thus, a large amount of chromium remains in a leather or leather article subjected to tanning using a chrome tanning agent.

Chromium is trivalent in chrome tanning agents. The trivalent chromium may be oxidized into hexavalent chromium through heating or bonding in the process of production of leathers or leather articles. Additionally, hexavalent chromium present as an impurity in chrome tanning agents may be incorporated in leathers or leather articles. Other than such hexavalent chromium incorporated through the process of production of leathers or leather articles, there is hexavalent chromium produced by the fact that trivalent chromium in the leathers or leather articles is oxidized, for example, by light, heat, or high temperature and humidity. The presence of hexavalent chromium can be examined by a measurement test. Trivalent chromium is non-toxic, while hexavalent chromium is toxic. When contacting the skin or mucous membranes, hexavalent chromium can induce skin roughness or allergy and, in severe cases, cause dermatitis or tumor. Thus, hexavalent chromium significantly affects the human body. Even a small amount of hexavalent chromium is considered to have all hazard risks including carcinogenicity, mutagenicity, and reproductive toxicity. Due to its toxicity, hexavalent chromium is specified as a banned substance.

Under the above circumstances, EU regulations on hexavalent chromium in leathers or leather articles were published as Regulations (EU), No. 3014/2014 in the Official Journal of European Union on Mar. 26, 2014. Concerning leather articles and products containing a leather in a part to be in contact with the skin, the Regulations specify that leather articles containing 3 mg/kg (3 ppm) or more of chromium(VI) oxide with respect to the total dry weight of the leather and leather part shall be restricted as of May 1, 2015 from the viewpoint of impacts on the human body (in particular, irritation to skin). The Regulations state that the method according to EN ISO 17075 is the only international standard analysis method currently available for quantification of hexavalent chromium in leathers or leather articles ((6) in the Regulations).

Under these circumstances, Patent Literature 1 states in Example 2 that placement of a drop of an aqueous solution of ascorbic acid on a tanned leather detoxified hexavalent chromium contained in the leather.

CITATION LIST

Patent Literature

Patent Literature 1: Japanese Patent Laid-Open No. 2008-231388

Non Patent Literature

Non Patent Literature 1: "Knowledge of Leather", the Japanese Association of Leather Technology (retrieved online on Dec. 14, 2015), Internet URL: <http://www.hikaku-kyo.org/htdoc/hikakunochisiki-04.htm>

SUMMARY OF INVENTION

Technical Problem

Hexavalent chromium treatment agents, such as the above aqueous solution of ascorbic acid, which employ an aqueous solvent have difficulty in penetrating into leathers. When a leather is treated with such a hexavalent chromium treatment agent, therefore, hexavalent chromium present in the vicinity of the surface of the leather is reduced into trivalent chromium, while hexavalent chromium present inside the leather may unfortunately remain without being reduced into trivalent chromium, so that the treatment agent may fail to exhibit a sufficient effect.

It is therefore an object of the present invention to provide a hexavalent chromium treatment agent capable of penetrating inside of a leather to reduce not only hexavalent chromium present in the vicinity of the surface of the leather but also hexavalent chromium present inside the leather into trivalent chromium.

Solution to Problem

A hexavalent chromium treatment agent of the present invention comprises a hexavalent chromium-reducing compound capable of reducing hexavalent chromium into trivalent chromium, a nonionic surfactant, and an aqueous solvent.

Advantageous Effects of Invention

The hexavalent chromium treatment agent of the present invention is capable of penetrating inside of a leather to reduce not only hexavalent chromium present in the vicinity of the surface of the leather but also hexavalent chromium present inside the leather into trivalent chromium.

DESCRIPTION OF EMBODIMENTS

<Hexavalent Chromium Treatment Agent>

The hexavalent chromium treatment agent of the present invention (which may be referred herein as "the hexavalent chromium treatment solution" or simply as the treatment solution or the treatment agent) comprises a hexavalent chromium-reducing compound capable of reducing hexavalent chromium into trivalent chromium, a nonionic surfactant, and an aqueous solvent. When brought into contact with a leather, the hexavalent chromium treatment agent can, thanks to the nonionic surfactant contained, penetrate inside of the leather to reduce not only hexavalent chromium present in the vicinity of the surface of the leather but also hexavalent chromium present inside the leather into trivalent chromium.

[Hexavalent Chromium-Reducing Compound]

Examples of the hexavalent chromium-reducing compound include compounds previously proposed by the present inventors (International Application No. PCT/JP2015/71509, international filing date: Jul. 29, 2015) in addition to ascorbic acid described in Patent Literature 1. Hereinafter, the hexavalent chromium-reducing compound proposed by the present inventors will be described.

The hexavalent chromium-reducing compound is a compound capable of reducing hexavalent chromium into trivalent chromium, and examples of the compound include an organic compound (A) represented by formula (1) below. This compound is composed of at least C, O, H atoms capable of acting to reduce hexavalent chromium into trivalent chromium (having the ability to reduce hexavalent chromium into trivalent chromium), has a single bond and double bond among three carbon atoms, and has a hydroxy group linked to the central carbon atom. The structure represented by formula (1) acts to reduce hexavalent chromium into trivalent chromium.

[Formula 1]

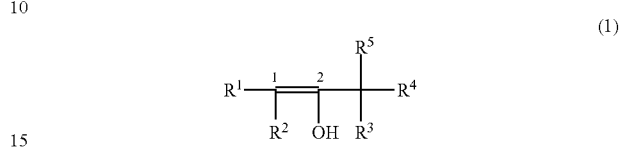

In formula (1), $R^1$, $R^2$, $R^3$, $R^4$, and $R^5$ are each independently a substituent composed of C, H, O (substituent composed of C, H, and optionally O), preferably contain a carbonyl group having an unsaturated bond, and have no reactive functional groups such as an aldehyde group and a carboxyl group. It is also preferable that $R^1$, $R^2$, $R^3$, $R^4$, and $R^5$ have no functional groups including nitrogen-containing groups such as an amine group and an isocyanate group and sulfur-containing groups such as a sulfate group. $R^1$ or $R^2$ and $R^3$, $R^4$, or $R^5$ may be linked together to form a ring.

The compound having the structure represented by formula (1) may be a cyclic hydrocarbon or may be also an aromatic hydrocarbon having a monocyclic ring or fused ring. When the compound is an aromatic hydrocarbon, the n bond is, in effect, delocalized without staying in the double bond between the carbon atoms 1 and 2 in formula (1). The cyclic hydrocarbon or aromatic hydrocarbon may have a substituent.

It is preferable that the organic compound (A) have the structure represented by formula (1) and a hydroxy group and have no reactive functional groups such as an aldehyde group and a carboxyl group in the structure.

It is preferable that the hexavalent chromium-reducing compound comprise, in addition to the organic compound (A), an organic compound (B) that has the structure represented by formula (1) and capable of acting to reduce hexavalent chromium into trivalent chromium and that has no hydroxyphenyl groups, no aldehyde groups, and no carboxyl groups. The organic compound (B) preferably has no functional groups including nitrogen-containing groups such as an amine group and an isocyanate group and sulfur-containing groups such as a sulfate group.

Examples of the organic compound (A) or (B) include the following compounds (formulas (2) to (14)) and derivatives thereof. In the present invention, it is also preferable to use a mixture of two or more of these compounds and derivatives thereof.

[Formula 2]

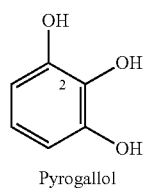

Pyrogallol

[Formula 3]

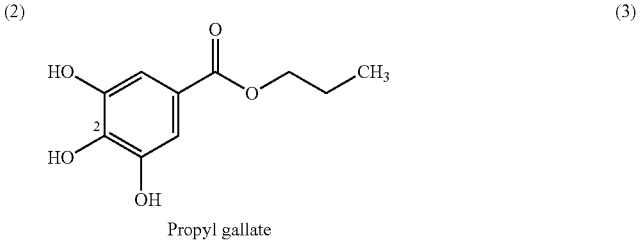

Propyl gallate

-continued
[Formula 4]
(4)
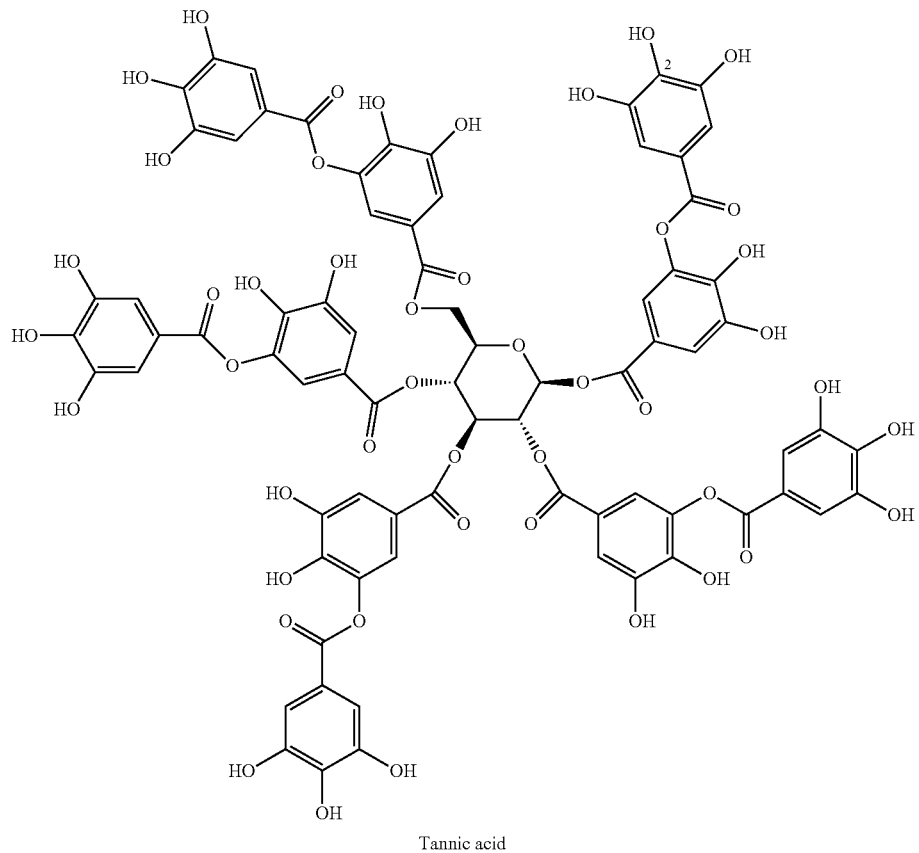
Tannic acid
[Formula 5]
(5)
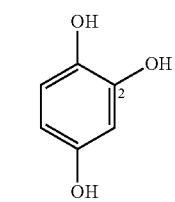
1,2,4-Trihydroxybenzene
[Formula 6]
(6)
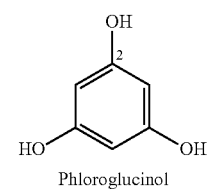
Phloroglucinol
[Formula 7]
(7)
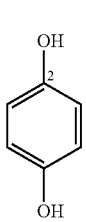
Resorcinol
[Formula 8]
(8)
Hydroquinone
[Formula 9]
(9)
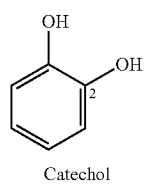
Catechol
[Formula 10]
(10)
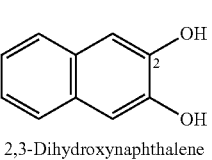
2,3-Dihydroxynaphthalene

[Formula 11]

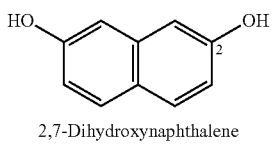

2,7-Dihydroxynaphthalene (11)

[Formula 12]

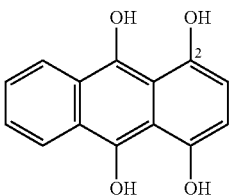

1,4,9,10-Anthracenetetrol (12)

[Formula 13]

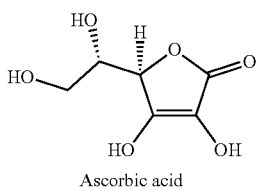

Ascorbic acid (13)

[Formula 14]

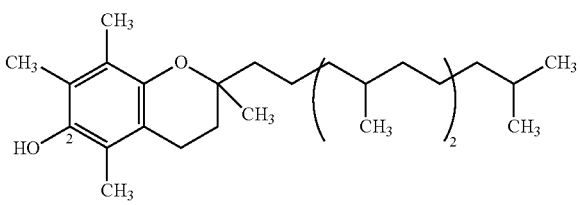

Tocopherol (14)

The carbon atom 2 in formulas (2) to (12) and (14) corresponds, for example, to the carbon atom 2 in formula (1).

The hexavalent chromium-reducing compound is an organic compound acting on hexavalent chromium, which is toxic, to chemically convert it into a non-toxic compound. For example, this hexavalent chromium-reducing compound can detoxify hexavalent chromium by reducing it into trivalent chromium.

Generally known reducing agents include lithium aluminum hydride, sodium borohydride, hydrazine, dibutylaluminum hydride, oxalic acid, and formic acid. The use of these typical reducing agents poses various problems.

When lithium aluminum hydride is used as a reducing agent, the agent is a strong reducing agent in the form of a powder. This reducing agent is dangerous because it reacts vigorously with water to produce hydrogen which is flammable. Such an agent that produces a flammable substance in this manner is unsuitable for use in leathers or leather articles which, in general, are often brought into contact with the skin (sweat) or exposed to rain.

When sodium borohydride is used as a reducing agent, the agent is somewhat hygroscopic and prone to degradation by water. The agent must therefore be stored in a sealed condition. An aqueous solution produced by contact of the agent with a water-containing substance such as sweat or rain is strongly basic, because the solution contains a degradation product of the agent. The agent can thus cause adverse effects on dermis (skin) and mucous membranes. When placed under acidic or neutral conditions, the agent is degraded to produce hydrogen; thus, the agent must be stored in an alkaline solution and cannot be contained in leathers or leather articles. The agent is also difficult to handle, because it is degraded by water to produce hydrogen.

Hydrazine is a colorless liquid with a pungent odor similar to that of ammonia, and releases white smoke when contacted with air. Hydrazine is therefore unsuitable for use. Additionally, hydrazine is difficult to handle because it is easily soluble in water, has high reducing capacity, is easily degradable, and is flammable.

When dibutylaluminum hydride is used as a reducing agent, the agent is a colorless liquid but is susceptible to humidity. The agent should therefore be stored and used in an inert gas atmosphere and is difficult to use in an ordinary air atmosphere.

When oxalic acid is used as a reducing agent, the agent is poisonous because it strongly binds to calcium ions in blood in the human body. Oxalic acid is designated as a non-medical deleterious substance under Poisonous and Deleterious Substances Control Law. The use of such a poisonous substance in leathers or leather articles is unsuitable for the intended purpose.

When formic acid is used as a reducing agent, the formic acid solution or formic acid vapor is harmful to the skin and eyes and can, in particular, do irreparable damage to the eyes. Additionally, inhalation of formic acid can cause a disorder such as pulmonary edema. Formic acid is therefore unsuitable for use. Moreover, chronic exposure to formic acid is considered to adversely affect the liver and kidney, and formic acid is also considered as a possible allergen. Formic acid is therefore unsuitable for the purpose of the present invention.

With these facts in mind, the present applicant conducted various investigations and experiments on hexavalent chromium-reducing compounds usable in leathers or leather articles and has found compounds suited for the intended purpose.

The organic compounds (A) and (B) comprised as the hexavalent chromium-reducing compound not only have the primary ability to treat and detoxify hexavalent chromium, but also are free of toxicity and cause no disorder such as skin roughness when leathers or leather articles treated with these compounds is in contact with the skin. The compounds (A) and (B) are preferably compounds that do not degrade each other by their reducing capacity and that are not reactive or interactive with each other. Such an organic compound is preferably a compound having a basic skeleton represented by formula (1) above and more preferably a stable compound comprising C, H, O atoms.

The organic compound having the structure represented by formula (1) has no functional groups such as an aldehyde group and a carboxyl group. It is preferable that the organic compound have no functional groups including nitrogen-containing groups such as an amine group and an isocyanate group and sulfur-containing groups such as a sulfate group. These functional groups are reactive and can undergo an unexpected reaction during use of leathers or leather articles, thus being unsuitable for hexavalent chromium-reducing compounds. The organic compound is capable of acting on hexavalent chromium to produce a compound not detected as a hexavalent chromium compound, thereby detoxifying hexavalent chromium.

(Organic Compound (A))

The organic compound (A) has the structure represented by formula (1) above and further has, for example, a hydroxyphenyl group represented by formula (15) below. With this functional group, the organic compound (A), when incorporated in leathers or leather articles, takes effect immediately, remains stable for a long time, maintains its reducing effect over a long period of time, and provides high heat resistance. Formation of hexavalent chromium is thus inhibited over a long period of time. Additionally, the organic compound (A) contained in leathers or leather articles is resistant to degradation by water-containing substances such as sweat and rain. The reason for these beneficial effects has not been clarified; however, the following hypothesis is formulated based on the fact that collagen, which is a main component of leathers, is, in general, chemically cross-linked and stabilized as a result of tanning: The organic compound (A) can remain for a long time, particularly thanks to the high interactivity of its hydroxyphenyl group with the collagen, while the organic compound (A) is incorporated in the collagen not completely but in such a manner that the organic compound (A) forms an island of a sea-island structure and is allowed a degree of freedom sufficient to exhibit the reducing capacity. Since the organic compound (A) is used in leathers or leather articles, a safe compound having low environmental impact is preferred as the organic compound (A).

[Formula 15]

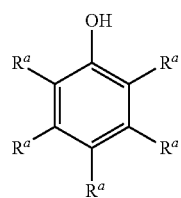

(15)

In formula (15), $R^a$ is a monovalent group or a divalent group. Examples of the monovalent group include a hydrogen atom, a hydrocarbon group, and an oxygen-containing group. Examples of the divalent group include a divalent hydrocarbon group and a divalent oxygen-containing group. Among these examples, a hydrogen atom, a monovalent hydrocarbon group, a divalent hydrocarbon group, or a hydroxy group is preferred to achieve higher compatibility with leathers or leather articles. A plurality of $R^a$ are independent from each other and may be the same or different. Adjacent $R^a$ groups may be linked together to form an aromatic ring or aliphatic ring. $R^a$ may be linked to $R^a$ of another hydroxyphenyl group. It is preferable that not all the $R^a$ groups be a hydrogen atom. In order that the organic compound (A) may take effect more immediately and exhibit higher reducing capacity stably over a long period of time in leathers or leather articles, the group represented by formula (15) is more preferably a dihydroxyphenyl group or trihydroxyphenyl group and even more preferably a 3,4,5-trihydroxyphenyl group.

Preferred as the hydrocarbon group is a $C_1$ to $C_{20}$ hydrocarbon group, and specific examples thereof include a $C_1$ to $C_{20}$ alkyl group, a $C_7$ to $C_{20}$ arylalkyl group, or an unsubstituted or substituted $C_6$ to $C_{20}$ aryl group. Examples of the hydrocarbon group include a methyl group, an ethyl group, a n-propyl group, an isopropyl group, an allyl group, a n-butyl group, an isobutyl group, a sec-butyl group, a t-butyl group, an amyl group, a n-pentyl group, a neopentyl group, a n-hexyl group, a n-heptyl group, a n-octyl group, a n-nonyl group, a n-decanyl group, a 3-methylpentyl group, a 1,1-diethylpropyl group, a 1,1-dimethylbutyl group, a 1-methyl-1-propylbutyl group, a 1,1-dipropylbutyl group, a 1,1-dimethyl-2-methylpropyl group, a 1-methyl-1-isopropyl-2-methylpropyl group, a cyclopentyl group, a cyclohexyl group, a cycloheptyl group, a cyclooctyl group, a norbornyl group, an adamantyl group, a phenyl group, an o-tolyl group, a m-tolyl group, a p-tolyl group, a xylyl group, an isopropylphenyl group, a t-butylphenyl group, a naphthyl group, a biphenyl group, a tert-phenyl group, a phenanthryl group, an anthracenyl group, a benzyl group, and a cumyl group. Examples of the hydrocarbon group further include hydrocarbon groups (an alkoxy group, for example) containing an oxygen-containing group such as a methoxy group, an ethoxy group, or a phenoxy group. Other examples of the hydrocarbon group include hydrocarbon groups containing an unsaturated carboxylic acid ester such as methyl ester, ethyl ester, n-propyl ester, isopropyl ester, n-butyl ester, isobutyl ester, or (5-norbornen-2-yl) ester (when the unsaturated carboxylic acid is a dicarboxylic acid, the ester may be either a monoester or diester).

An example of the oxygen-containing group is a hydroxy group.

Examples of the organic compound (A) include:
the compounds of formulas (2) to (12) and (14);
phenol, o-cresol, m-cresol, p-cresol, 2,3-dimethylphenol, 2,5-dimethylphenol, 3,4-dimethylphenol, 3,5-dimethylphenol, 2,4-dimethylphenol, 2,6-dimethylphenol, 2,3,5-trimethylphenol, 3,4,5-trimethylphenol, 2-tert-butylphenol, 3-tert-butylphenol, 4-tert-butylphenol, BHT (dibutylhydroxytoluene), BHA (butylhydroxyanisole), 2-phenylphenol, 3-phenylphenol, 4-phenylphenol, 3,5-diphenylphenol, 2-naphthylphenol, 3-naphthylphenol, 4-naphthylphenol, 4-tritylphenol, 2-methylresorcinol, 4-methylresorcinol, 5-methylresorcinol, 4-tert-butylcatechol, 2-methoxyphenol, 3-methoxyphenol, 2-propylphenol, 3-propylphenol, 4-propylphenol, 2-isopropylphenol, 3-isopropylphenol, 4-isopropylphenol, 2-methoxy-5-methylphenol, 2-tert-butyl-5-methylphenol, thymol, isothymol, 1-naphthol, 2-naphthol, 2-methyl-1-naphthol, 4-methoxy-1-naphthol, and 7-methoxy-2-naphthol;

dihydroxynaphthalenes such as 1,5-dihydroxynaphthalene, 1,7-dihydroxynaphthalene, and 2,6-dihydroxynaphthalene;

tetrahydroxynaphthalenes such as 1,3,6,8-tetrahydroxynaphthalene;

methyl 3-hydroxy-naphthalene-2-carboxylate, 9-hydroxyanthracene, 1-hydroxypyrene, 1-hydroxyphenanthrene, 9-hydroxyphenanthrene, bisphenolfluorene, and phenolphthalein;

benzophenone derivatives such as 2,3,4-trihydroxybenzophenone and 2,2',3,4-tetrahydroxybenzophenone;

tannins such as catechol tannin, pyrogallol tannin, oak gall tannin, gallic tannin, and phlorotannin;

flavonoids such as anthocyanin, rutin, quercetin, fisetin, daidzein, hesperetin, hesperidin, chrysin, and flavonol;

catechins such as catechin, gallocatechin, catechin gallate, epicatechin, epigallocatechin, epicatechin gallate, epigallocatechin gallate, procyanidin, and theaflavin;

curcumin and lignan;

rhododendrol [4-(p-hydroxyphenyl)-2-butanol];

acylated rhododendrols such as acetyl rhododendrol, hexanoyl rhododendrol, octanoyl rhododendrol, dodecanoyl rhododendrol, tetradecanoyl rhododendrol, hexadecanoyl rhododendrol, octadecanoyl rhododendrol, 4-(3-acetoxybutyl)phenyl acetate, 4-(3-propanoyloxybutyl)phenyl propanoate, 4-(3-octanoyloxybutyl)phenyl octanoate, and 4-(3-palmitoyloxybutyl)phenyl palmitate;

alkyl ethers of rhododendrol such as 4-(3-methoxybutyl)phenol, 4-(3-ethoxybutyl)phenol, and 4-(3-octyloxybutyl)phenol;

rhododendrol glycosides such as rhododendrol-D-glucoside (α- or β-glycoside), rhododendrol-D-galactoside (α- or β-glycoside), rhododendrol-D-xyloside (α- or β-glycoside), and rhododendrol-D-maltoside (α- or β-glycoside); and α-tocopherol, β-tocopherol, γ-tocopherol, and 5-tocopherol.

Other examples of the organic compound (A) include derivatives of the above substances, such as compounds having an alkoxy group and esterified products. Specific examples of the derivatives include pyrogallol-1,3-dimethyl ether, pyrogallol-1,3-diethyl ether, and 5-propylpyrogallol-1-methyl ether.

Examples of the organic compound (A) include compounds with the structure represented by formula (2) above (1,2,3-trihydroxybenzene skeleton) and derivatives thereof. Such compounds have the ability to remove hexavalent chromium.

Examples of the derivatives include those having a substituent such as a hydrocarbon group or oxygen-containing group at the 4-, 5-, 6-positions of the compound represented by formula (2) above. Preferred examples of the substituent include a $C_1$ to $C_{20}$ hydrocarbon group, a $C_1$ to $C_{20}$ alkoxy group, and a $C_1$ to $C_{20}$ esterified product, and more preferred examples include a $C_1$ to $C_{10}$ hydrocarbon group, a $C_1$ to $C_{20}$ alkoxy group, and a $C_1$ to $C_{10}$ esterified product. These groups are as described above. The same applies to derivatives of compounds described later. Examples of the derivatives include: a gallic acid ester such as the compound represented by formula (3) above; and the compound represented by formula (4) above which has a plurality of the structures represented by formula (2) above per molecule and derivatives of the compound of formula (4). Specific examples include catechol tannin, pyrogallol tannin, oak gall tannin, gallic tannin, and phlorotannin.

As indicated above, the substituents introduced at the 4-, 5-, 6-positions can be those suitable for the way in which the organic compound (A) is used. For example, when the compound is used by being dissolved in an ester solvent, an ester group can be introduced to increase the compatibility with the solvent.

In the present invention, the organic compound (A) preferably comprises (i) a gallic acid ester and (ii) at least one compound selected from tannic acid and a derivative thereof, and more preferably comprises (i) a gallic acid ester and (ii) tannic acid.

The gallic acid ester has a relatively low molecular weight and may therefore be considered likely to bleed out of leathers or leather articles. However, the gallic acid ester can, due to having a structural moiety corresponding to tannic acid, favorably interact with the tannic acid or derivative thereof and become unlikely to bleed out while maintaining the reducing power. When incorporated in leathers or leather articles, the gallic acid ester has reducing power and takes effect immediately. The reducing power of the gallic acid ester is not as high as that of ascorbic acid, but higher than that of tannic acid; thus, the gallic acid ester can continue to exhibit reducing power over a long period of time even after degradation and loss of reducing power of ascorbic acid (the gallic acid ester can again reduce hexavalent chromium ions newly produced by oxidation). When incorporated in leathers or leather articles, the gallic acid ester is resistant to water-containing substances such as sweat and rain and unlikely to be degraded.

The tannic acid and derivative thereof are bulky, and as seen from the fact that they are conventionally used in tanning, they have high affinity to collagen in leathers or leather articles and are unlikely to bleed out. When incorporated in leathers or leather articles, the tannin acid and derivative thereof can maintain their reducing power over a long period of time. They can therefore inhibit formation of hexavalent chromium over a longer period of time. The tannic acid and derivative thereof have low potential to irritate humans (the skin) and are safe. As for the reducing power, the tannic acid and derivative thereof takes effect slowly as compared to ascorbic acid and the gallic acid ester. However, the tannic acid and derivative thereof have high affinity to leather and leather articles and are resistant to degradation; therefore, the tannic acid and derivative thereof have a higher potential to maintain the reducing power until leather articles fulfil their function and purpose, than ascorbic acid and the gallic acid ester.

When comprising these compounds, therefore, the organic compound (A) has a high ability to penetrate into leathers or leather articles and is capable of remaining in leathers or leather articles for a long time and continuing to reduce hexavalent chromium stably over a long period of time. Additionally, although polyphenols can be considered to have a potential to cause browning or discoloration because of their high reducing capacity, the above compounds are incorporated in leathers or leather articles before discoloration and are therefore less likely to cause color fading or color change, thus posing a lower risk of impairing the color or texture of leathers or leather articles. This is also the reason why the above compounds are preferred.

In formula (2) above, hydroxy groups are present at the 1-, 2-, and 3-positions. However, the same effect can be provided by compounds having a skeleton in which hydroxy groups are introduced at the 1-, 2-, and 4-positions (formula (5) above) or a skeleton in which hydroxy groups are introduced at the 1-, 3-, and 5-positions (formula (6) above). Derivatives of such compounds also have the same effect.

In formula (2) above, three hydroxy groups are introduced into one aromatic ring. However, compounds having one hydroxy group or two hydroxy groups on an aromatic ring also have the hexavalent chromium removing ability. Examples of compounds having such a skeleton include phenol, BHT, compounds represented by formulas (7), (8), and (9) above, and derivatives thereof.

Compounds having a hydroxy group on a plurality of linked aromatic rings also have the same effect. Examples of the compounds include those having one or more hydroxy groups on a naphthalene ring. Examples of such compounds having two hydroxy groups are those represented by formulas (10) and (11) above. Derivatives of such compounds also have the hexavalent chromium removing ability like the compounds previously described.

Compounds having one or more hydroxy groups introduced at any positions of an anthracene ring made up of three linked aromatic rings also exhibit the same ability. An example of such compounds is that represented by formula (12) above. Derivatives of such compounds also have the hexavalent chromium removing ability.

Examples of the compound represented by formula (1) include compounds having a long-chain alkyl group and a heterocyclic ring. Such compounds have enhanced organic nature and decreased water solubility. However, these compounds have improved affinity for organic solvents and thus have the advantage of being soluble in hydrocarbon solvents. An example of the compounds is that represented by formula (14) above.

Preferred as the compound represented by formula (1) above are catechins such as catechin, gallocatechin, catechin gallate, epicatechin, epigallocatechin, epicatechin gallate, epigallocatechin gallate, procyanidin, and theaflavin and derivatives of the catechins. These catechins are superior in terms of safety and exhibit high reducing power in leathers or leather articles.

(Organic Compound (B))

The organic compound (B) has the structure represented by formula (1) above and is devoid of, for example, the hydroxyphenyl group represented by formula (15). Being devoid of the hydroxyphenyl group, the organic compound (B) has difficulty in penetrating into leathers or leather articles; however, thanks to having the structure represented by formula (1), the organic compound (B) is capable of successfully detoxifying hexavalent chromium present at the surface of leathers or leather articles by reducing it into trivalent chromium. The use of the compound (B) can therefore provide an immediate effect on preventing hexavalent chromium ions from dissolving in a water-containing substance such as sweat or rain and leaching into the environment or contacting humans. An example of the organic compound (B) is a compound having a hetero ring. Examples of the hetero ring include furan, chromene, isochromene, and xanthene. Examples of derivatives of such compounds include the compound having the structure represented by formula (13) above and derivatives thereof, erythorbic acid and derivatives thereof, and 4-hydroxyfuran-2(5H)-one. These compounds have the hexavalent chromium removing ability.

Examples of the derivatives of ascorbic acid include, but are not limited to, ascorbic acid esters, ascorbic acid phosphate, ascorbic acid sulfate, ascorbyl glucoside (2-O-α-D-glucopyranosyl-L-ascorbic acid), ascorbyl glucosamine, and dehydroascorbic acid.

Examples of the derivatives of erythorbic acid include erythorbic acid esters.

In the present invention, the organic compound (B) is preferably at least one compound selected from ascorbic acid and erythorbic acid and is more preferably ascorbic acid. This compound is easily degradable, thus being unable to maintain its effect over a long period of time and likely to bleed out of leathers or leather articles. However, this compound has low irritation potential on, and is safe for, humans (skin) and, in addition, it has high reducing power and takes effect immediately. Bringing a treatment agent containing the compound (B) into contact with a leather or leather article can therefore effectively prevent hexavalent chromium ions from leaching into the environment and contacting humans. In particular, the surface of the leather or leather article can be detoxified quickly, which makes it possible to successfully reduce the occurrence of skin roughness or allergy. The compound (B) is unreactive and incompatible with the organic compound (A) and undegradable by the compound (A). The compound (B) can therefore be well mixed in the treatment solution. Additionally, when the compound (B) having strong reducing power is incorporated, browning or discoloration caused by the organic compound (A) can be prevented. The compound (B) is also preferred in that the compound (B), due to being easily degradable, is unlikely to cause coloring and does not impair the color or texture of leathers or leather articles.

As stated above, compounds having the basic skeleton represented by formula (1) in the molecule are capable of detoxifying and removing hexavalent chromium.

(Preferred Embodiments of Hexavalent Chromium-Reducing Compound)

The hexavalent chromium-reducing compound is preferably at least one selected from a compound (A-i) represented by formula (A-i) below and a tannin (A-ii). It is more preferable to use the compound (A-i) represented by formula (A-i) below and the tannin (A-ii) in combination.

The compound (A-i) is represented by formula (A-i) below.

[Formula 16]

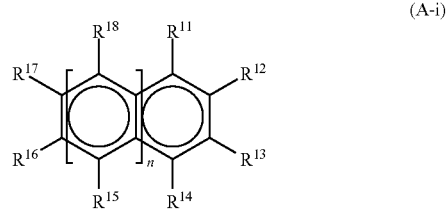

(A-i)

In the formula above, n represents 0, 1, or 2. That is, the compound (A-i) has a benzene, naphthalene, or anthracene structure.

$R^{11}$ to $R^{18}$ each independently represent a hydrogen atom, a hydroxy group, a $C_1$ to $C_4$ alkyl group, a $C_1$ to $C_4$ alkoxy group, or a group represented by formula (a-i) below. In formula (a-i), $R^{19}$ is a $C_1$ to $C_4$ alkyl group.

[Formula 17]

(a-i)

Examples of the $C_1$ to $C_4$ alkyl group include a methyl group, an ethyl group, a n-propyl group, an i-propyl group, a n-butyl group, an i-butyl group, a s-butyl group, and a t-butyl group. Examples of the $C_1$ to $C_4$ alkoxy group include a methoxy group, an ethoxy group, a n-propoxy group, an isopropoxy group, a n-butoxy group, an isobutoxy group, a s-butoxy group, and a t-butoxy group.

When n is 0, at least one of $R^{11}$ to $R^{14}$, $R^{16}$, and $R^{17}$ is a hydroxy group. It is preferable that two or three of $R^{11}$ to $R^{14}$, $R^{16}$, and $R^{17}$ be hydroxy groups, because in this case the ability to reduce hexavalent chromium is increased.

When n is 1 or 2, at least one of $R^{11}$ to $R^{18}$ is a hydroxy group. When n is 1 or 2, it is preferable that two or three of $R^{11}$ to $R^{18}$ be hydroxy groups, because in this case the ability to reduce hexavalent chromium is increased.

When n is 2, a plurality of $R^{15}$ may be the same or different, and a plurality of $R^{18}$ may be the same or different.

$R^{16}$ and $R^{17}$ may be linked together to form a five-membered ring or a six-membered ring. The atoms constituting the ring may include not only carbon atoms but also an oxygen atom. The ring may have a $C_1$ to $C_{16}$ alkyl group as a substituent. The $C_1$ to $C_{16}$ alkyl group may be linear or branched.

Specific examples of the compound (A-i) include the compounds represented by formulas (2), (3), (5) to (12), and (14) above and the compounds mentioned above as examples. One compound (A-i) may be used alone, or two or more compounds (A-i) may be used in combination.

The tannin (A-ii) may be a hydrolyzable tannin or condensed tannin. Examples of the hydrolyzable tannin include gallotannins such as tannic acid (the compound represented by formula (4) above) and ellagitannin. In view of preparation of the treatment agent described later, a hydrolyzable tannin is suitably used. One tannin (A-ii) may be used, or two or more tannins (A-ii) may be used in combination.

In the compound (A-i) and tannin (A-ii), the carbon to which a hydroxy group is bonded corresponds, for example, to the carbon 2 in formula (1) above.

The hexavalent chromium-reducing compound to be used preferably comprises at least one selected from a compound (B-i) represented by formula (B-i) below and a compound (B-ii) represented by formula (B-ii) below together with the compound (A-i) and tannin (A-ii).

[Formula 18]

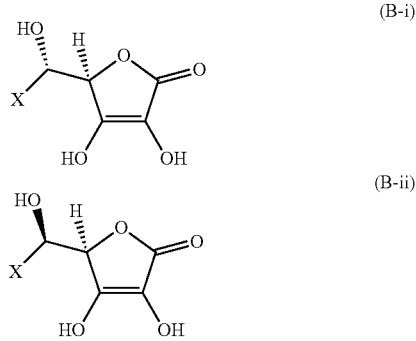

In the formulas above, X is a group represented by any one of formulas (b-i) to (b-iii) below. In formulas (b-i) to (b-iii) below, o is an integer of 0 to 3, p is an integer of 1 to 3, and q is an integer of 1 to 17.

[Formula 19]

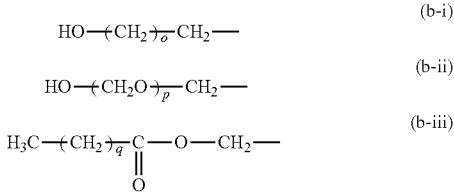

Specific examples of the compound (B-i) and compound (B-ii) include the above compound represented by formula (13) and the compounds mentioned above as examples. One compound (B-i) may be used alone, or two or more compounds (B-i) may be used in combination. One compound (B-ii) may be used alone, or two or more compounds (B-ii) may be used in combination. The compounds (B-i) and (B-ii) may be used in combination.

When a leather is treated using the compound (A-i), (A-ii), (B-i), or (B-ii) as the hexavalent chromium-reducing compound, namely when a leather or leather article is treated so that the compound (A-i), (A-ii), (B-i), or (B-ii) is incorporated in the leather or leather article, not only hexavalent chromium having been present in the leather or leather article before the treatment but also hexavalent chromium produced by some cause after the treatment can be reduced, for example, into trivalent chromium which is non-toxic. This has the consequence that the hexavalent chromium content can be kept below the limit specified by Regulations (EU), No. 3014/2014 until the leather or leather article fulfills its function and purpose. In particular, when the compound (A-i) which takes effect immediately and the compound (A-ii) which takes effect slowly are combined, the hexavalent chromium content can be more reliably kept below the limit by the Regulations until the leather or leather article fulfills its function and purpose. When the compound (B-i) and/or (B-ii) which has high reducing power and takes effect immediately is further combined with the compound (A-i) and/or (A-ii), hexavalent chromium, particularly that present in the vicinity of the surface of the leather or leather article, can be effectively reduced at the time of treatment.

The proportions of the organic compounds (A) and (B) in the hexavalent chromium treatment agent are not particularly limited as long as the effect of the present invention is obtained. The proportions are preferably such that the weight percentage ratio between the organic compounds (A) and (B) ((A):(B)) is 50 to 90:10 to 50, more preferably 50 to 80:20 to 50, and even more preferably 50 to 70:30 to 50 (it should be noted that the total amount of the compounds (A) and (B) is defined as 100% by weight). Although the organic compound (B) has a high ability to take effect immediately, it has difficulty in penetrating into leathers or leather articles and thus cannot have high long-term stability. The amount of the organic compound (B) is therefore preferably similar to or smaller than that of the organic compound (A). However, if the amount of the organic compound (B) is 10% by weight or less, there is a possibility that hexavalent chromium present in the surface of leathers or leather articles cannot be successfully reduced and detoxified into trivalent chromium.

When the hexavalent chromium treatment agent comprises (i) the gallic acid ester, (ii) the at least one compound selected from tannic acid and a derivative thereof, and the organic compound (B), the proportions of these compounds are not particularly limited as long as the effect of the present invention is obtained. The proportions are preferably such that the weight percentage ratio ((i):(ii):(B)) is 1 to 20:30 to 89:10 to 50, more preferably 3 to 17:33 to 77:20 to 50, and even more preferably 5 to 15:35 to 65:30 to 50 (it should be noted that the total amount of the compounds (i), (ii), and (B) is defined as 100% by weight). The proportion of the organic compound (A) is as previously described. Preferred as the organic compound (B) is ascorbic acid and/or erythorbic acid, because ascorbic acid and erythorbic acid are incompatible with the compounds (i) and (ii) and are not incorporated in the compound (ii), thus being able to successfully reduce the surface of leathers or leather articles. The primary effect of the compounds (i) and (ii) is to reduce hexavalent chromium present inside leathers or leather articles. Ascorbic acid, propyl gallate, and tannic acid meet the international safety standards at concentrations thereof used in leather or leather articles regarding carcinogenicity, skin sensitization, and skin irritation as specified in the OECD Guidelines for the Testing of Chemicals. The compound (i) has high reducing power and is relatively easily degradable. The compound (ii) having a structural moiety corresponding to the compound (i) can be degraded to give the compound (i), and exhibits its reducing power more slowly than ascorbic acid and the gallic acid ester. The amount of the compound (ii) is therefore preferably greater than that of the compound (i). The compound (i) is pointed out as having somewhat higher potential to irritate humans (skin) than the compound (ii) and organic compound (B) and also has a relative risk of causing coloring. The amount of the compound (i) used is therefore preferably smaller than those of the compound (ii) and organic compound (B). If the amount of the compound (i) is less than 1% by weight, hexavalent chromium in leathers or leather articles may not be quickly detoxified, and hexavalent chromium ions remaining untreated may leach on the surface of leather or leather articles upon failure of the organic compound (B) to fully treat hexavalent chromium or after inactivation of the organic compound (B). Polyphenols can be considered to have a potential to cause browning or discoloration because of their high reducing capacity; however, when used in the above proportions, the compounds (i), (ii), and (B) can be successfully incorporated in leathers or leather articles before discoloration and are therefore less likely to cause color fading or color change, thus hardly impairing the color or texture of leathers or leather articles. This is a reason why the above proportions are preferred. The above proportions are preferred also because when used in the proportions, the compounds (i), (ii), and (B) are easily soluble both in water and in organic solvents. Such a treatment solution is preferred because it can exhibit high long-term reliability.

When the hexavalent chromium treatment agent comprises the compound (A-i) and the tannin (A-ii), the proportions of the compound (A-i) and the tannin (A-ii) are not particularly limited as long as the effect of the present invention is obtained. The proportions are preferably such that the weight percentage ratio ((A-i):(A-ii)) is 11 to 70:30 to 89, more preferably 23 to 67:33 to 77, and even more preferably 35 to 50:50 to 65 (it should be noted that the total amount of the compound (A-i) and tannin (A-ii) is defined as 100% by weight). With such proportions, the hexavalent chromium content can be kept low over a long period of time.

When the hexavalent chromium treatment agent comprises the compound (A-i), the tannin (A-ii), and the compound (B-i) and/or (B-ii), the proportions of the compound (A-i), the tannin (A-ii), and the total of the compounds (B-i) and (B-ii) are not particularly limited as long as the effect of the present invention is obtained. The proportions are preferably such that the weight percentage ratio ((A-i):(A-ii):(B-i)+(B-ii)) is 1 to 20:30 to 89:10 to 50, more preferably 3 to 17:33 to 77:20 to 50, and even more preferably 5 to 15:35 to 65:30 to 50 (it should be noted that the total amount of the compound (A-i), the tannin (A-ii), and the compounds (B-i) and (B-ii) is defined as 100% by weight). The reason why such proportions are preferred are as described above for the proportions of the compounds (i), (ii), and (B); namely, the compound (i), compound (ii), and compound (B) in the above description can be replaced by the compound (A-i), tannin (A-ii), and compounds (B-i) and (B-ii), respectively.

[Nonionic Surfactant]

The hexavalent chromium removing agent of the present invention comprises a surfactant. Since the hexavalent chromium-reducing compound undergoes an ionic reaction when interacting with hexavalent chromium, a nonionic surfactant is suitably used as the surfactant so as not to affect the ionic reaction. According to the present invention, this nonionic surfactant allows the hexavalent chromium treatment agent to penetrate inside of leathers and therefore allows the hexavalent chromium-reducing compound of the treatment agent to reduce hexavalent chromium present inside the leather into trivalent chromium.

Examples of the nonionic surfactant include: ether surfactants such as polyoxyethylene lauryl ether, polyoxyethylene cetyl ether, polyoxyethylene oleyl ether, polyoxyethylene stearyl ether, polyoxyethylene isodecyl ether, polyoxyethylene-2-ethylhexyl ether, other linear alkyl ethers of polyoxyethylene, branched alkyl ethers of polyoxyethylene, polyoxyethylene polyoxypropylene alkyl ethers, polyoxypropylene stearyl ether, and other polyoxyalkylene ethers; ester surfactants such as polyoxyethylene monolaurate, polyoxyethylene monostearate, and polyoxyethylene monooleate; sorbitan ester surfactants such as sorbitan monocaprylate, sorbitan monolaurate, sorbitan monomyristate, sorbitan monopalmitate, sorbitan monostearate, sorbitan monooleate, sorbitan sesquioleate, and sorbitan trioleate; sorbitan ester ethylene oxide adduct surfactants such as polyoxyethylene sorbitan monolaurate, polyoxyethylene sorbitan monostearate, and polyoxyethylene sorbitan monooleate; diester surfactants such as ethylene glycol distearate, polyethylene glycol distearate, polyethylene glycol dioleate, polypropylene glycol distearate, and polypropylene glycol disuccinate; monoglyceride surfactants such as glycerol monostearate and glycerol monomyristate; monoglyceride ethylene oxide adduct surfactants such as polyoxyethylene glyceryl cocoate; triglyceride ethylene oxide adduct surfactants such as polyoxyethylene hydrogenated castor oil and polyoxyethylene triisostearic acid; sorbitol ester ethylene oxide adduct surfactants such as polyoxyethylene tetraoleate; polyglycerol alkyl ester surfactants such as polyglycerol oleate, polyglycerol laurate, and polyglycerol stearate; polyether amine surfactants such as cocoalkylamine ethylene oxide adduct, N,N-di(hydroxyethyl)laurylamine, polyoxyethylene laurylamine, polyoxyethylene polyoxypropylene laurylamine, polyoxyethylene cocoalkylamine, polyoxyethylene stearylamine, polyoxyethylene oleylamine, polyoxyethylene tallowalkylamine, and polyoxyethylene alkylpropylenediamine; alkanolamide surfactants such as coconut diethanolamide (1:2 type), other coconut diethanolamides, tallow diethanolamide (1:2 type), lauric diethanolamide, oleic diethanolamide, coconut monoethanolamide, and lauric isopropanolamide; alkanolamide ethylene oxide adduct surfactants such as polyoxyethylene fatty acid monoethanolamide; amine oxide surfactants such as dimethyllaurylamine oxide, dimethylstearylamine oxide, and dihydroxyethyllaurylamine oxide (these amine oxide surfactants are commercially-available, for example, in the form of aqueous solutions); and polyethylene glycol-polypropylene glycol-block ether surfactants such as polyethylene glycol-polypropylene glycol-polyethylene glycol (block copolymer). Among these, ether surfactants and amine oxide surfactants are suitably used, since they have no influence on metallic parts (such as watch buckles) made of stainless steel or titanium. One of these surfactants may be used alone, or a mixture of two or more thereof may be used.

[Aqueous Solvent]

The aqueous solvent used in the hexavalent chromium removing agent of the present invention is water or a mixed solvent of water and an organic solvent.

Examples of the organic solvent include $C_1$ to $C_3$ alcohols (methanol, ethanol, propanol, and isopropanol (IPA)), butanol, acetone, methyl ethyl ketone (MEK), and N,N-dimethylformamide (DMF).

Organic solvents are preferred in that they easily penetrate into leathers and are able to dissolve the hexavalent reducing compound; however, when an organic solvent is used alone, the organic solvent can impair the color quality, color, texture, or the like of leathers or leather articles. In particular, for treatment of a delicate leather or leather article having high aesthetic quality, water alone or a mixed solvent of water and a $C_1$ to $C_3$ alcohol is preferably used because they have a low potential to impair the color quality, color, texture, or the like of the leather or leather article. In this respect, water alone or a mixed solvent of water and IPA is more preferably used, and water alone is even more preferably used. In the present invention, the nonionic surfactant is used to resolve the difficulty of penetration of water or a mixed solvent of water and an organic solvent into leathers.

Examples of the delicate leather or leather article having high aesthetic quality include leathers or leather articles subjected to lacquering or glazing.

As described above, the hexavalent chromium treatment agent of the present invention can decrease the amount of hexavalent chromium present inside a leather without affecting the quality of the leather even if the leather is delicate.

When the aqueous solvent is a mixed solvent of water and an organic solvent, the amount of the organic solvent used is preferably more than 0% by mass and not more than 20% by mass with respect to 100% by mass of the total amount of water and the organic solvent. When this amount of the organic solvent is used, the organic compounds (A) and (B) can be successfully dissolved and mixed, so that the treatment of a leather or leather article can be accomplished without impairing the color quality, color, texture, or the like of the leather or leather article or causing discoloration or browning of the leather or leather article. Even if the amount of the organic solvent is small, the treatment agent can penetrate deep into the leather or leather article by virtue of the action of the nonionic surfactant.

[Amounts of Components in Treatment Agent]

The hexavalent chromium treatment agent contains the hexavalent chromium-reducing compound, for example, in an amount of 0.01 to 10.0% by mass.

When only the organic compound (A) is used as the hexavalent chromium-reducing compound, the total amount of the organic compound (A) contained in the hexavalent chromium treatment solution is preferably, but not limited to, about 0.01 to 10.0% by weight, more preferably about 0.1 to 7.0% by weight, even more preferably about 0.3 to 5.0% by weight, still even more preferably about 0.5 to 3.0% by weight, and most preferably about 0.5 to 2.0% by weight, with respect to 100% by weight of the treatment solution. The reason why this amount of the organic compound (A) is preferred is that in this case the potential to cause color fading or color change is particularly decreased. Additionally, the hexavalent chromium content can be kept low over a long period of time.

When the organic compounds (A) and (B) are used in combination, the total amount of the organic compounds (A) and (B) contained in the hexavalent chromium treatment solution is preferably, but not limited to, about 0.01 to 10.0% by weight, more preferably about 0.1 to 7.0% by weight, even more preferably about 0.3 to 5.0% by weight, still even more preferably about 0.5 to 3.0% by weight, and most preferably about 0.5 to 2.0% by weight with respect to 100% by weight of the treatment solution. The reason why this total amount of the organic compounds (A) and (B) is preferred is that in this case the potential to cause color fading or color change is particularly decreased. Additionally, the hexavalent chromium content can be kept low over a long period of time.

When the hexavalent chromium treatment agent comprises the compound (A-i) and/or tannin (A-ii) and optionally the compound (B-i) and/or compound (B-ii), the amounts of these compounds are as described above for the amounts of the compounds (A) and (B); namely, in the above description of the amounts of the components, the compound (A) can be replaced by the total of the compound (A-i) and tannin (A-ii), and the compound (B) can be replaced by the total of the compounds (B-i) and (B-ii).

The foregoing descriptions other than that of the amounts of the components also apply to the case where the hexavalent chromium treatment agent comprises the compound (A-i) and/or tannin (A-ii) and optionally the compound (B-i) and/or compound (B-ii); namely, in the foregoing descriptions, the (i) gallic acid ester can be replaced by the compound (A-i), the (ii) tannic acid can be replaced by the compound (A-ii), the compound (A) can be replaced by the compound (A-i) and tannin (A-ii), and the compound (B) can be replaced by the compounds (B-i) and (B-ii).

The nonionic surfactant is preferably contained in an amount of 0.01 to 1.0% by mass, more preferably 0.1 to 1.0% by mass, with respect to 100% by mass of the treatment solution. When this amount of the nonionic surfactant is contained, the treatment agent can quickly penetrate inside of leathers.

The method for preparing the hexavalent chromium treatment agent is not particularly limited as long as the hexavalent chromium-reducing compound and nonionic surfactant can be dissolved.

The kinematic viscosity at 25° C. of the hexavalent chromium treatment agent is not particularly limited as long as the effect of the present invention is obtained. In order for the treatment agent to quickly penetrate into leathers or leather articles and accomplish detoxification, the kinematic viscosity at 25° C. of the treatment agent is preferably 0.001 cSt or more and less than 5 cSt, more preferably 0.01 cSt or more and 4.5 cSt or less, even more preferably 0.05 cSt or more and 4.3 cSt or less, and still even more preferably 0.1 cSt or more and 4.0 cSt or less. The kinematic viscosity can be adjusted, for example, by using the components in the amounts described above. Japanese Patent Laid-Open No. 2008-272552 describes a treatment agent (aqueous solution) for hexavalent chromium-polluted soil that contains ascorbic acid and that is thickened with a thickener to have a viscosity of 5 cP or more. As stated in this publication, if the viscosity of the treatment agent is less than 5 cP, the treatment agent has too high an ability to penetrate into soil and fails to spread evenly in soil. Treatment agents having a viscosity of less than 5 cP cannot therefore be used for treatment of hexavalent chromium in soil. Collagen, which is a main component in leathers or leather articles, is chemically cross-linked and stabilized in leathers or leather articles; thus, treatment agents having a viscosity of 5 cP or more may therefore fail to penetrate into leathers or leather articles.

<Leather or Leather Article and Method for Producing the Same>

A leather or leather article according to the present invention comprises the hexavalent chromium-reducing compound and nonionic surfactant of the hexavalent chromium treatment agent described above. As stated above, the use of the hexavalent chromium treatment agent comprising the nonionic surfactant permits the hexavalent chromium-reducing compound to reside inside leathers. The leather or leather article can be produced by treating a leather or leather article with the hexavalent chromium treatment agent described above.

Examples of the leather used in the present invention include, but are not limited to, leathers obtained by chrome tanning of cow skin, sheep skin, goat skin, pig skin, horse skin, deer skin, kangaroo skin, ostrich skin, crocodile skin, lizard skin, snake skin, bird skin, and fish skin. Leathers subjected to splitting, shaving, retanning, dyeing, fatliquoring, and finishing after chrome tanning may also be used. In particular, the leather used in the present invention may be a delicate leather subjected to lacquering or glazing.

Furthermore, the leather used in the present invention may be a processed product (leather article) of any leather mentioned above. Examples of the processed product include shoes, clothes, hats, gloves, belts, wallets, business card cases, watchbands, bags, sofas, cushion covers, book covers, pen cases, mobile phone cases, personal planners, key cases, automotive interiors, glasses cases, and tool cases.

A leather article can be obtained by cutting a purchased sheet of leather into a desired shape and attaching the cut sheet to a core material or the cut sheets to each other by means of an adhesive or by sewing. For example, a watchband is obtained as follows: a sheet of leather cut in the shape of the band is attached to the periphery, namely the front and back sides, of a core material with an adhesive, and the core material with the sheet of leather is heated. Depending on the type of the article, the article is finished, for example, by hemming for improving its texture.

The leather treatment with the treatment agent described above, namely detoxification of hexavalent chromium, is carried out by bringing a crude leather containing hexavalent chromium or a crude leather article containing hexavalent chromium into contact with the hexavalent chromium treatment agent. The term "crude leather" or "crude leather article" may be used herein to refer to a leather or leather article that has not yet been treated with the treatment agent containing the hexavalent chromium-reducing compound. The method for making the contact is not particularly limited as long as the effect of the present invention is obtained. Examples of the method include spraying, atomizing, dipping, spreading, and immersion. Specifically, the removing agent may be applied to a leather sheet or a cut sheet of leather by spraying with a spray or by spreading with a brush. Alternatively, the surface of the leather sheet or cut sheet of leather may be rubbed with a cloth impregnated with the removing agent. Furthermore, the leather sheet or cut sheet of leather may be immersed in the removing agent. When a delicate leather or leather article which has a very vulnerable surface susceptible to scratches is treated, it is preferable to apply the agent to the leather or leather article by spraying with a spray. In this way, the hexavalent chromium-reducing compound of the hexavalent chromium removing agent, together with the surfactant, is incorporated in a leather. Consequently, hexavalent chromium is detoxified, and a harmless leather is obtained.

An example of the process of tanning will now be described. In general, fat, proteins, etc. are removed from raw skin stripped from an animal, and then the skin is subjected to the chrome tanning step. Thereafter, the skin is washed, dried in a drum, and then processed with a roll coater into a leather (a sheet of leather, for example). For example, the hexavalent chromium treatment agent can be introduced into the drum to detoxify hexavalent chromium. Since the roll coater has a large number of holes, the detoxification can be carried out, for example, by spraying the hexavalent chromium treatment agent together with water from the holes. In these cases, the hexavalent chromium treatment agent used is preferably in the form of a treatment solution containing water alone as a solvent or a treatment solution containing water and a $C_1$ to $C_3$ alcohol.

It is also conceivable that a finished leather article such as a commercially-available article contains hexavalent chromium. When, for example, such a leather article attached to a watch is treated, the leather article is detached from the watch, and the removing agent may be applied to the leather article by spraying with a spray or by spreading with a brush. Alternatively, the surface of the detached leather article may be rubbed with a cloth impregnated with the removing agent or the detached leather article may be immersed in the removing agent. In this way, the hexavalent chromium-reducing compound of the hexavalent chromium removing agent, together with the surfactant, is incorporated in the leather.

It is preferable to apply the treatment agent to the back side of the leather rather than to the front side (grain side). The reason for this is that the treatment agent has difficulty in penetrating through the front side of the leather because the front side of the leather intrinsically has high density and may, in some cases, be painted in the finishing step.

The amount of the hexavalent chromium removing agent to be used can be determined as appropriate in consideration of the size and density of the fibers of the leather. To successfully accomplish the treatment with the hexavalent chromium removing agent, it is preferable, for example, to apply the treatment agent containing the hexavalent chromium-reducing compound at a concentration within the range described above to one side of the to-be-treated surface of the leather using a spray, determine the amount of the applied treatment agent at the time when the treatment agent begins to seep to the other side of the to-be-treated surface of the leather, and employ the thus determined amount for the treatment. When this amount of the treatment agent is used, in general, the hexavalent chromium content can be kept below the limit specified by the Regulations until the leather or leather article fulfills its function and purpose.

When a leather or leather article is treated with the hexavalent chromium treatment agent of the present invention, the hexavalent chromium-reducing compound reduce hexavalent chromium present in the leather or leather article into trivalent chromium. Thus, the leather or leather article comes to contain trivalent chromium and the remaining hexavalent chromium-reducing compound not consumed in the reduction. Through the treatment with the hexavalent chromium-reducing compound, the hexavalent chromium content in the leather or leather article, as measured according to ISO 17075:2008-02, is typically decreased to less than 3 ppm, preferably to 2 ppm or less. The trivalent chromium content varies depending on the leather or leather article and is not particularly limited. The trivalent chromium content is typically 4000 ppm or more, and may be 4500 ppm or more or even 5000 ppm or more. The total chromium content remains unchanged before and after the treatment with the hexavalent chromium treatment agent.

Once the hexavalent chromium-reducing compound is incorporated into a leather or leather article by the above treatment (the hexavalent chromium-reducing compound may reside in wax of the leather), the hexavalent chromium-reducing compound can, even when non-toxic chromium is converted to hexavalent chromium which is toxic after the treatment, detoxify the hexavalent chromium produced after the treatment. Therefore, the leather or leather article treated with the hexavalent chromium removing agent can keep the hexavalent chromium content below the limit specified by the Regulations until the leather or leather article fulfills its function and purpose.

As described above, the present invention relates to the following.

[1]

A hexavalent chromium treatment agent comprising a hexavalent chromium-reducing compound capable of reducing hexavalent chromium into trivalent chromium, a non-ionic surfactant, and an aqueous solvent.

The hexavalent chromium treatment agent as defined above can penetrate inside of a leather to reduce not only hexavalent chromium present in the vicinity of the surface of the leather but also hexavalent chromium present inside the leather into trivalent chromium.

[2]

The hexavalent chromium treatment agent according to [1], wherein the hexavalent chromium-reducing compound is an organic compound (A) that has a structure represented by the following formula (1) and capable of acting to reduce hexavalent chromium into trivalent chromium, that has a hydroxyphenyl group, and that has no aldehyde groups and no carboxyl groups:

[Formula 20]

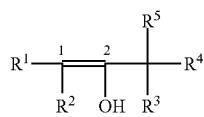

(1)

wherein $R^1$, $R^2$, $R^3$, $R^4$, and $R^5$ are each independently a substituent composed of C, H, O, and $R^4$ or $R^2$ and $R^3$, $R^4$, or $R^5$ may be linked together to form a ring.

[3]

The hexavalent chromium treatment agent according to [2], wherein the organic compound (A) has a structure represented by the formula (1) and capable of acting to reduce hexavalent chromium into trivalent chromium, has a dihydroxyphenyl group or a trihydroxyphenyl group, and has no aldehyde groups and no carboxyl groups.

[4]

The hexavalent chromium treatment agent according to [3], wherein the organic compound (A) has a structure represented by the formula (1) and capable of acting to reduce hexavalent chromium into trivalent chromium, has a 3,4,5-trihydroxyphenyl group, and has no aldehyde groups and no carboxyl groups.

[5]

The hexavalent chromium treatment agent according to claim 4, wherein the organic compound (A) comprises:
(i) a gallic acid ester; and
(ii) at least one compound selected from tannic acid and a derivative thereof.

[6]

The hexavalent chromium treatment agent according to [5], wherein the compound (ii) is tannic acid.

[7]

The hexavalent chromium treatment agent according to any of [1] to [6], wherein the hexavalent chromium-reducing compound further comprises an organic compound (B) that has a structure represented by the formula 1 and capable of acting to reduce hexavalent chromium into trivalent chromium and that has no hydroxyphenyl groups, no aldehyde groups, and no carboxyl groups.

[8]

The hexavalent chromium treatment agent according to [7], wherein the organic compound (B) is at least one compound selected from ascorbic acid, a derivative of ascorbic acid, erythorbic acid, and a derivative of erythorbic acid.

[9]

The hexavalent chromium treatment agent according to [1], wherein the hexavalent chromium-reducing compound is at least one selected from a compound (A-i) represented by the following formula (A-i) and a tannin (A-ii):

[Formula 21]

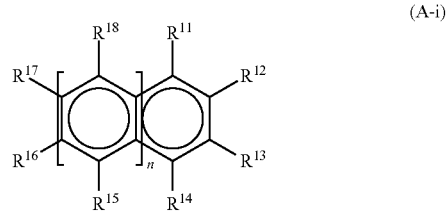

(A-i)

wherein
n represents 0, 1, or 2,
$R^{11}$ to $R^{18}$ each independently represent a hydrogen atom, a hydroxy group, a $C_1$ to $C_4$ alkyl group, a $C_1$ to $C_4$ alkoxy group, or a group represented by the following formula (a-i),
when n is 0, at least one of $R^{11}$ to $R^{14}$, $R^{16}$, and $R^{17}$ is a hydroxy group,
when n is 1 or 2, at least one of $R^{11}$ to $R^{18}$ is a hydroxy group,
when n is 2, a plurality of $R^{15}$ may be the same or different, and a plurality of $R^{18}$ may be the same or different,
$R^{16}$ and $R^{17}$ may be linked together to form a five-membered ring or a six-membered ring, and the ring may have a $C_1$ to $C_{16}$ alkyl group as a substituent:

[Formula 22]

(a-i)

wherein $R^{19}$ represents a $C_1$ to $C_4$ alkyl group.

[10]

The hexavalent chromium treatment agent according to [9], wherein the hexavalent chromium-reducing compound further comprises at least one selected from a compound (B-i) represented by the following formula (B-i) and a compound (B-ii) represented by the following formula (B-ii):

[Formula 23]

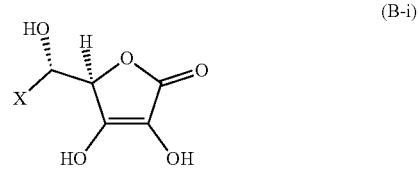

(B-i)

-continued

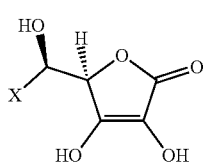
(B-ii)

wherein X represents a group represented by any one of the following formulas (b-i) to (b-iii):

[Formula 24]

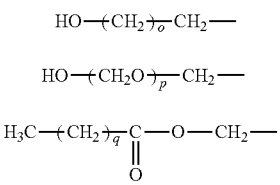

wherein o represents an integer of 0 to 3, p represents an integer of 1 to 3, and q represents an integer of 1 to 17.

The use of any of the hexavalent chromium treatment agents as defined in [2] to [10] above enables a leather or leather article to keep the hexavalent chromium content below the limit specified by the Regulations (EU) 3014/2014 until the leather or leather article fulfills its function and purpose.

[11]

The hexavalent chromium treatment agent according to any of [1] to [10], wherein the nonionic surfactant is an ether surfactant and/or amine oxide surfactant.

The nonionic surfactant as defined in [11] above has no influence on a metallic part (a watch buckle, for example) made of stainless steel or titanium and is preferably used.

[12]

The hexavalent chromium treatment agent according to any of [1] to [11], wherein the hexavalent chromium treatment agent contains the hexavalent chromium-reducing compound in an amount of 0.01 to 10.0% by mass and the nonionic surfactant in an amount of 0.01 to 1.0% by mass.

With the concentrations as defined in [12] above, the treatment agent can quickly penetrate inside of leather.

[13]

A leather or leather article comprising the hexavalent chromium-reducing compound and the nonionic surfactant of the hexavalent chromium treatment agent according to any of [1] to [12].

The leather or leather article as defined above can keep the hexavalent chromium content low over a long period of time.

[14]

A method for producing a leather or leather article, comprising treating a leather or leather article with the hexavalent chromium treatment agent according to any of [1] to [12].

With the production method as defined above, the hexavalent chromium treatment agent can penetrate inside of a leather, so that not only hexavalent chromium present in the vicinity of the surface of the leather but also hexavalent chromium present inside the leather can be reduced into trivalent chromium.

EXAMPLES

Hereinafter, the present invention will be described in more detail with reference to examples. The present invention is not limited to these examples.

Example 1-1

A crocodile leather sheet and cow leather sheet subjected to chrome tanning were prepared. The sheets were each cut into a size suitable for use as a watchband. The hexavalent chromium content in these leather sheets, as determined by the procedure according to ISO 17075:2008-02, was 8 ppm for the crocodile leather sheet and 3 ppm for the cow leather sheet. The total chromium content in the leather bands was quantified with a fluorescent X-ray analyzer (an energy-dispersive fluorescent X-ray analyzer, "JSX-3202EV ELEMENT ANALYZER", available from JEOL Ltd.) and determined to be 7141 ppm for the crocodile leather band and 16362 ppm for the cow leather band. The reference samples used were JSX-3000 series reference sample 1, JSX-3000 series reference sample 2, and JSX-3000 series energy calibration reference sample which are available from JEOL Ltd. The measurement was conducted using JSX starter and then Plastic D3 in accordance with Quick Manual (Nos. EY07007-J00 and J00 EY07007G, issued in August 2007) provided by JEOL Ltd.

0.5 g of the compound represented by formula (3), 2.5 g of the compound represented by formula (4), 2.0 g of the compound represented by formula (13), and 2.5 g of polyoxyethylene alkyl ether (EMULGEN 707 (trade name), available from Kao Corporation) were dissolved in water to obtain a hexavalent chromium treatment agent. The water was used in an amount such that the total amount of the hexavalent chromium treatment agent was 500 g.

The above crocodile leather was immersed in the obtained hexavalent chromium treatment agent and then dried to obtain a hexavalent chromium treatment agent-treated leather. Likewise, a treated leather was obtained using the above cow leather. Immediately thereafter, the hexavalent chromium content in each treated leather was measured according to ISO 17075:2008-02. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Examples 1-2 and 1-3

Hexavalent chromium treatment agents and hexavalent chromium treatment agent-treated leathers (crocodile leather and cow leather) were obtained in the same manner as in Example 1-1, except for changing the amount of polyoxyethylene alkyl ether to 0.5 g and to 5 g.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 1-4

A hexavalent chromium treatment agent and hexavalent chromium treatment agent-treated leathers (crocodile leather and cow leather) were obtained in the same manner as in Example 1-1, except for using 1.5 g of the compound represented by formula (3) and 3.5 g of the compound represented by formula (4), instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 1-5

A hexavalent chromium treatment agent and hexavalent chromium treatment agent-treated leathers (crocodile leather and cow leather) were obtained in the same manner as in Example 1-1, except for using 15 g of the compound represented by formula (4) instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 2-1

A hexavalent chromium treatment agent and hexavalent chromium treatment agent-treated leathers (crocodile leather and cow leather) were obtained in the same manner as in Example 1-1, except for using an aqueous dimethyllaurylamine oxide solution (UNISAFE A-LM (trade name), available from NOF CORPORATION) instead of polyoxyethylene alkyl ether and using the aqueous dimethyllaurylamine oxide solution and water in amounts such that the concentration of dimethyllaurylamine oxide in the treatment agent was 0.5 wt %.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Examples 2-2 and 2-3

Hexavalent chromium treatment agents and hexavalent chromium treatment agent-treated leathers (crocodile leather and cow leather) were obtained in the same manner as in Example 2-1, except for using the aqueous dimethyllaurylamine oxide solution and water in amounts such that the concentration of dimethyllaurylamine oxide was 0.1 wt % or 1 wt %.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 2-4

A hexavalent chromium treatment agent and hexavalent chromium treatment agent-treated leathers (crocodile leather and cow leather) were obtained in the same manner as in Example 2-1, except for using 1.5 g of the compound represented by formula (3) and 3.5 g of the compound represented by formula (4), instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 2-5

A hexavalent chromium treatment agent and hexavalent chromium treatment agent-treated leathers (crocodile leather and cow leather) were obtained in the same manner as in Example 2-1, except for using 15 g of the compound represented by formula (4) instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 3-1

A crocodile leather sheet and cow leather sheet subjected to chrome tanning were prepared. The sheets were each cut into a size suitable for use as a watchband. The hexavalent chromium content in these leather sheets, as determined by the procedure according to ISO 17075:2008-02, was 8 ppm for the crocodile leather sheet and 3 ppm for the cow leather sheet. The total chromium content in the leather bands was quantified with a fluorescent X-ray analyzer and determined to be 7141 ppm for the crocodile leather band and 16362 ppm for the cow leather band.

Next, water and IPA were mixed in a ratio of 95:5 (mass percentage ratio) to prepare a mixed solvent.

0.5 g of the compound represented by formula (3), 2.5 g of the compound represented by formula (4), 2.0 g of the compound represented by formula (13), and 2.5 g of polyoxyethylene alkyl ether (EMULGEN 707 (trade name), available from Kao Corporation) were dissolved in the mixed solvent to obtain a hexavalent chromium treatment agent. The mixed solvent was used in an amount such that the total amount of the hexavalent chromium treatment agent was 500 g.

The above crocodile leather was immersed in the obtained hexavalent chromium treatment agent and then dried to obtain a hexavalent chromium treatment agent-treated leather. Likewise, a treated leather was obtained using the above cow leather. The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Examples 3-2 and 3-3

Hexavalent chromium treatment agents and hexavalent chromium treatment agent-treated leathers (crocodile leather and cow leather) were obtained in the same manner as in Example 3-1, except for changing the amount of polyoxyethylene alkyl ether to 0.5 g and to 5 g.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 3-4

A hexavalent chromium treatment agent and hexavalent chromium treatment agent-treated leathers (crocodile leather and cow leather) were obtained in the same manner as in Example 3-1, except for using 1.5 g of the compound represented by formula (3) and 3.5 g of the compound represented by formula (4), instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 3-5

A hexavalent chromium treatment agent and hexavalent chromium treatment agent-treated leathers (crocodile leather and cow leather) were obtained in the same manner as in Example 3-1, except for using 15 g of the compound represented by formula (4) instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 4-1

A hexavalent chromium treatment agent and hexavalent chromium treatment agent-treated leathers (crocodile leather and cow leather) were obtained in the same manner as in Example 3-1, except for using an aqueous dimethyllaurylamine oxide solution (UNISAFE A-LM (trade name), available from NOF CORPORATION) instead of polyoxyethylene alkyl ether and using the aqueous dimethyllaurylamine oxide solution and the mixed solvent in amounts such that the concentration of dimethyllaurylamine oxide in the treatment agent was 0.5 wt %.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Examples 4-2 and 4-3

Hexavalent chromium treatment agents and hexavalent chromium treatment agent-treated leathers (crocodile leather and cow leather) were obtained in the same manner as in Example 4-1, except for using the aqueous dimethyllaurylamine oxide solution and the mixed solvent in amounts such that the concentration of dimethyllaurylamine oxide was 0.1 wt % or 1 wt %.

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 4-4

A hexavalent chromium treatment agent and hexavalent chromium treatment agent-treated leathers (crocodile leather and cow leather) were obtained in the same manner as in Example 4-1, except for using 1.5 g of the compound represented by formula (3) and 3.5 g of the compound represented by formula (4), instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 4-5

A hexavalent chromium treatment agent and hexavalent chromium treatment agent-treated leathers (crocodile leather and cow leather) were obtained in the same manner as in Example 4-1, except for using 15 g of the compound represented by formula (4) instead of 0.5 g of the compound represented by formula (3), 2.5 g of the compound represented by formula (4), and 2.0 g of the compound represented by formula (13).

The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Example 5-1

A crocodile leather sheet and cow leather sheet subjected to chrome tanning were prepared. The sheets were each cut into a size suitable for use as a watchband. The hexavalent chromium content in these leather sheets, as determined by the procedure according to ISO 17075:2008-02, was 8 ppm for the crocodile leather sheet and 3 ppm for the cow leather sheet. The total chromium content in the leather bands was quantified with a fluorescent X-ray analyzer and determined to be 7141 ppm for the crocodile leather band and 16362 ppm for the cow leather band.

0.5 g of the compound represented by formula (3), 2.5 g of the compound represented by formula (4), 2.0 g of the compound represented by formula (13), and 1.25 g of polyoxyethylene alkyl ether (EMULGEN 707 (trade name), available from Kao Corporation) were dissolved in water. To the resulting solution was added an aqueous dimethyllaurylamine oxide solution in an amount such that the concentration of dimethyllaurylamine oxide in the resulting treatment agent was 0.25 wt %. A hexavalent chromium treatment agent was thus obtained. Water was used in an amount such that the total amount of the hexavalent chromium treatment agent was 500 g.

The above crocodile leather was immersed in the obtained hexavalent chromium treatment agent and then dried to obtain a hexavalent chromium treatment agent-treated leather. Likewise, a treated leather was obtained using the above cow leather. The hexavalent chromium content in each treated leather was measured according to ISO 17075:2008-02 immediately after the leather was obtained. The hexavalent chromium content was not more than the detection limit (2 ppm) for both the crocodile leather and cow leather. For both the crocodile leather and cow leather, the total chromium content as quantified by the fluorescent X-ray analyzer remained unchanged before and after the treatment with the hexavalent chromium treatment agent.

Comparative Example 1

A crocodile leather sheet and cow leather sheet obtained through chrome tanning were prepared. The sheets were each cut into a size suitable for use as a watchband.

Next, 5.0 g of the compound represented by formula (13) was mixed with water, and the mixture was homogenized to obtain a hexavalent chromium treatment agent. Water was used in an amount such that the total amount of the hexavalent chromium treatment agent was 500 g.

The above crocodile leather was immersed in the obtained hexavalent chromium treatment agent and then dried to obtain a hexavalent chromium treatment agent-treated leather. Likewise, a treated leather was obtained using the above cow leather.

Evaluation

When the leathers were immersed in the treatment agents obtained in Examples 1-1 to 1-5, 2-1 to 2-5, 3-1 to 3-5, 4-1 to 4-5, and 5-1, bubbles emerged quickly from the surface of the leathers, and the color of the leathers changed quickly into a deep color. This confirmed that the treatment agents penetrated quickly into the leathers. Furthermore, when the treatment agents obtained in Examples 1-1 to 1-5, 2-1 to 2-5, 3-1 to 3-5, 4-1 to 4-5, and 5-1 were applied to the leathers by spraying, the treatment agents did not form beads on the surface of the leathers, and the color of the leathers changed quickly into a deep color. This confirmed that the treatment agents penetrated quickly into the leathers.

By contrast, when the leathers were immersed in the hexavalent chromium treatment agent obtained in Comparative Example 1, a layer of air was formed on the side of the leathers that was opposite to the grain side. When withdrawn from the treatment agent, the leathers showed no change in color, which confirmed that this treatment agent had difficulty in penetrating into the leathers. When the treatment agent obtained in Comparative Example 1 was applied to the leathers by spraying, the treatment agent formed beads on the surface of the leathers, which confirmed that this treatment agent had difficulty in penetrating into the leathers.

The invention claimed is:

1. A hexavalent chromium treatment agent comprising a hexavalent chromium-reducing compound capable of reducing hexavalent chromium into trivalent chromium, a nonionic surfactant, and an aqueous solvent,
   wherein the hexavalent chromium-reducing compound comprises:
   at least one selected from a compound (A-i) represented by the following formula (A-i) and a tannin (A-ii), and
   at least one selected from a compound (B-i) represented by the following formula (B-i) and a compound (B-ii) represented by the following formula (B-ii),

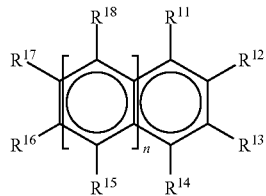

(A-i)

wherein
n represents 0, 1, or 2,
$R^{11}$ to $R^{18}$ each independently represent a hydrogen atom, a hydroxy group, a $C_1$ to $C_4$ alkyl group, a $C_1$ to $C_4$ alkoxy group, or a group represented by the following formula (a-i),
when n is 0, at least one of $R^{11}$ to $R^{14}$, $R^{16}$, and $R^{17}$ is a hydroxy group,
when n is 1 or 2, at least one of $R^{11}$ to $R^{18}$ is a hydroxy group,
when n is 2, a plurality of $R^{15}$ may be the same or different, and a plurality of $R^{18}$ may be the same or different,
$R^{16}$ and $R^{17}$ may be linked together to form a five-membered ring or a six-membered ring, and the ring may have a $C_1$ to $C_{16}$ alkyl group as a substituent,

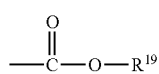
(a-i)

wherein $R^{19}$ represents a $C_1$ to $C_4$ alkyl group,

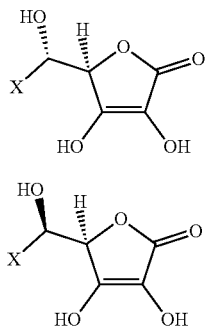
(B-i)
(B-ii)

wherein X represents a group represented by any one of the following formulas (b-i) to (b-iii),

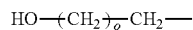
(b-i)
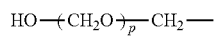
(b-ii)
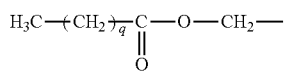
(b-iii)

wherein o represents an integer of 0 to 3, p represents an integer of 1 to 3, and q represents an integer of 1 to 17.

2. The hexavalent chromium treatment agent according to claim 1, wherein the nonionic surfactant is an ether surfactant and/or an amine oxide surfactant.

3. The hexavalent chromium treatment agent according to claim 1, wherein the hexavalent chromium treatment agent contains the hexavalent chromium-reducing compound in an amount of 0.01 to 10.0% by mass and the nonionic surfactant in an amount of 0.01 to 1.0% by mass.

4. A leather or leather article comprising a hexavalent chromium-reducing compound capable of reducing hexavalent chromium into trivalent chromium, and a nonionic surfactant,
wherein the hexavalent chromium-reducing compound comprises:
an organic compound (A) that has a structure represented by the following formula (1) and capable of acting to reduce hexavalent chromium into trivalent chromium, that has a hydroxyphenyl group, and that has no aldehyde groups and no carboxyl groups, and
an organic compound (B) that has a structure represented by the following formula (1) and capable of acting to reduce hexavalent chromium into trivalent chromium and that has no hydroxyphenyl groups, no aldehyde groups, and no carboxyl groups,

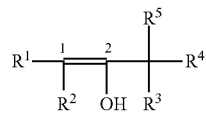
(1)

wherein $R^1$, $R^2$, $R^3$, $R^4$, and $R^5$ are each independently a substituent composed of C, H, O, and $R^1$ or $R^2$ and $R^3$, $R^4$, or $R^5$ may be linked together to form a ring.

5. A method for producing a leather or leather article, comprising treating a leather or leather article with a hexavalent chromium treatment agent comprising a hexavalent chromium-reducing compound capable of reducing hexavalent chromium into trivalent chromium, a nonionic surfactant, and an aqueous solvent,
wherein the hexavalent chromium-reducing compound comprises:
an organic compound (A) that has a structure represented by the following formula (1) and capable of acting to reduce hexavalent chromium into trivalent chromium, that has a hydroxyphenyl group, and that has no aldehyde groups and no carboxyl groups, and
an organic compound (B) that has a structure represented by the following formula (1) and capable of acting to reduce hexavalent chromium into trivalent chromium and that has no hydroxyphenyl groups, no aldehyde groups, and no carboxyl groups,

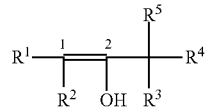
(1)

wherein $R^1$, $R^2$, $R^3$, $R^4$, and $R^5$ are each independently a substituent composed of C, H, O, and $R^1$ or $R^2$ and $R^3$, $R^4$, or $R^5$ may be linked together to form a ring.

* * * * *